United States Patent

[11] 3,552,511

| [72] | Inventors | Robert L. Marcheso<br>Flanders;<br>Bohdan Lukaschewsky, Parsippay, N.J. |
|---|---|---|
| [21] | Appl. No. | 724,109 |
| [22] | Filed | Apr. 25, 1968 |
| [45] | Patented | Jan. 5, 1971 |
| [73] | Assignee | Fairbanks Morse Inc.<br>New York, N.Y.<br>a corporation of Delaware |

[54] METHOD AND APPARATUS FOR CALCULATING A PIECE COUNT BY WEIGHING CALCULATIONS
29 Claims, 7 Drawing Figs.

[52] U.S. Cl. ................................................. 177/1,
177/25, 177/200; 235/151.33
[51] Int. Cl. ................................................. G01g 19/00
[50] Field of Search ............................................. 177/1, 25,
30, 200, 210, 211; 235/29W, 151.33, 151.3,
151.35, 160(Inquired)

[56] References Cited
UNITED STATES PATENTS

| 2,918,270 | 12/1959 | Golding | 177/30 |
| 2,974,863 | 3/1961 | Williams, Jr. et al. | 235/151.33 |
| 3,031,139 | 4/1962 | Spingies et al. | 235/160 |
| 3,055,585 | 9/1962 | Bell et al. | 177/200UX |
| 3,072,206 | 1/1963 | Langevin, Jr. et al. | 177/30 |
| 3,115,202 | 12/1963 | Langevin | 177/30X |
| 3,137,357 | 6/1964 | Brenner | 177/210UX |
| 3,153,459 | 10/1964 | Smith et al. | 177/210X |
| 3,249,745 | 5/1966 | Burkhart | 235/160 |
| 3,315,069 | 4/1967 | Bohm | 235/164 |
| 3,353,008 | 11/1967 | Kitz et al. | 235/160 |

*Primary Examiner*—Richard B. Wilkinson
*Assistant Examiner*—George H. Miller, Jr.
*Attorney*—Daniel W. Sixbey ABSTRACT: The piece count calculating method and apparatus operates to determine the number of pieces in a container or the number of pieces to be placed into a container by employing known values primarily provided by a weighing system to automatically calculate a desired unknown value. The basic weight values are converted to pulse signals and digital calculator techniques are utilized to accomplish the calculation with the ultimate result being expressed in whole numbers.

INVENTORS
Robert L. Marcheso
Bohdan Lukaschewsky

BY Daniel W Sifley
ATTORNEY

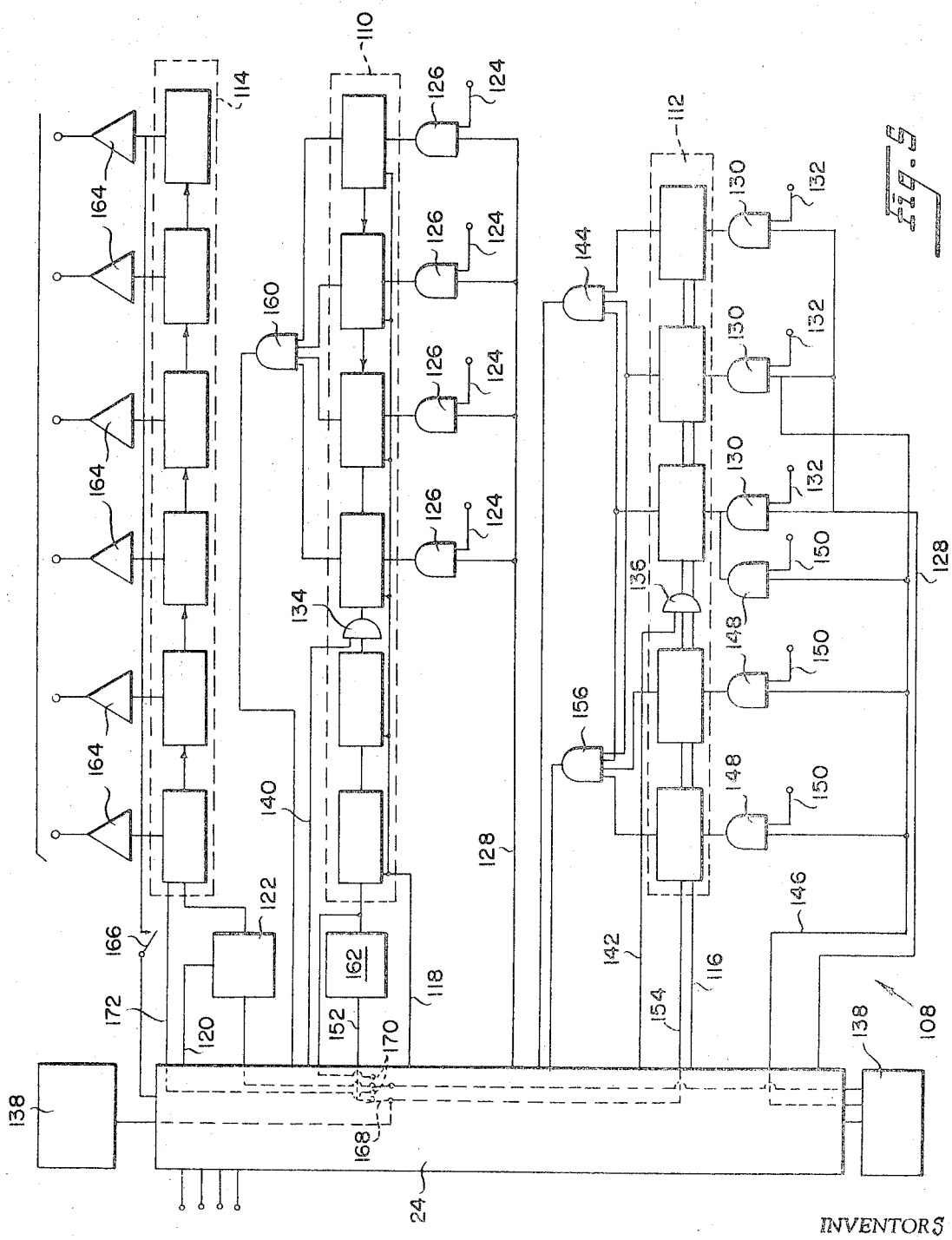

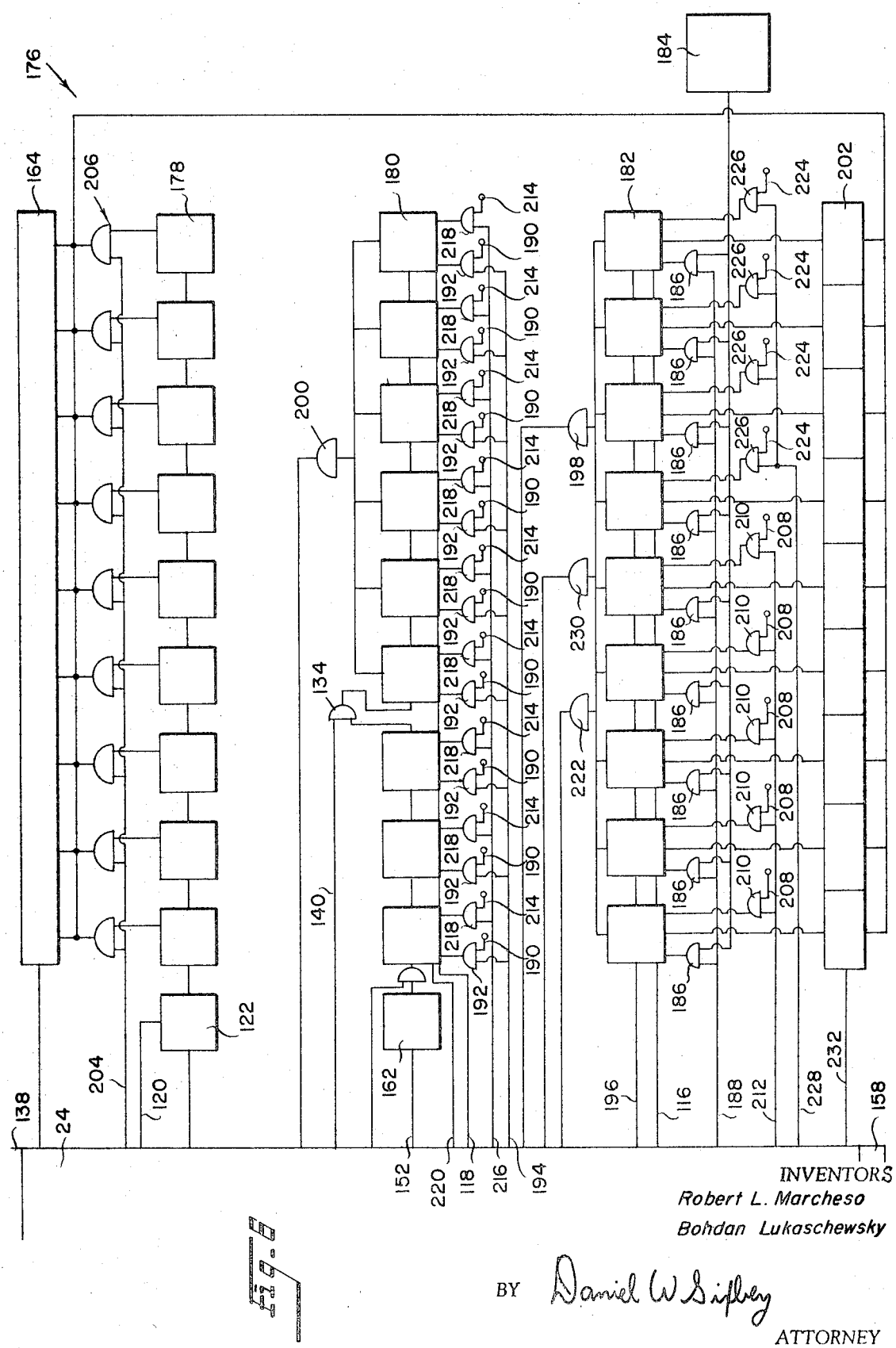

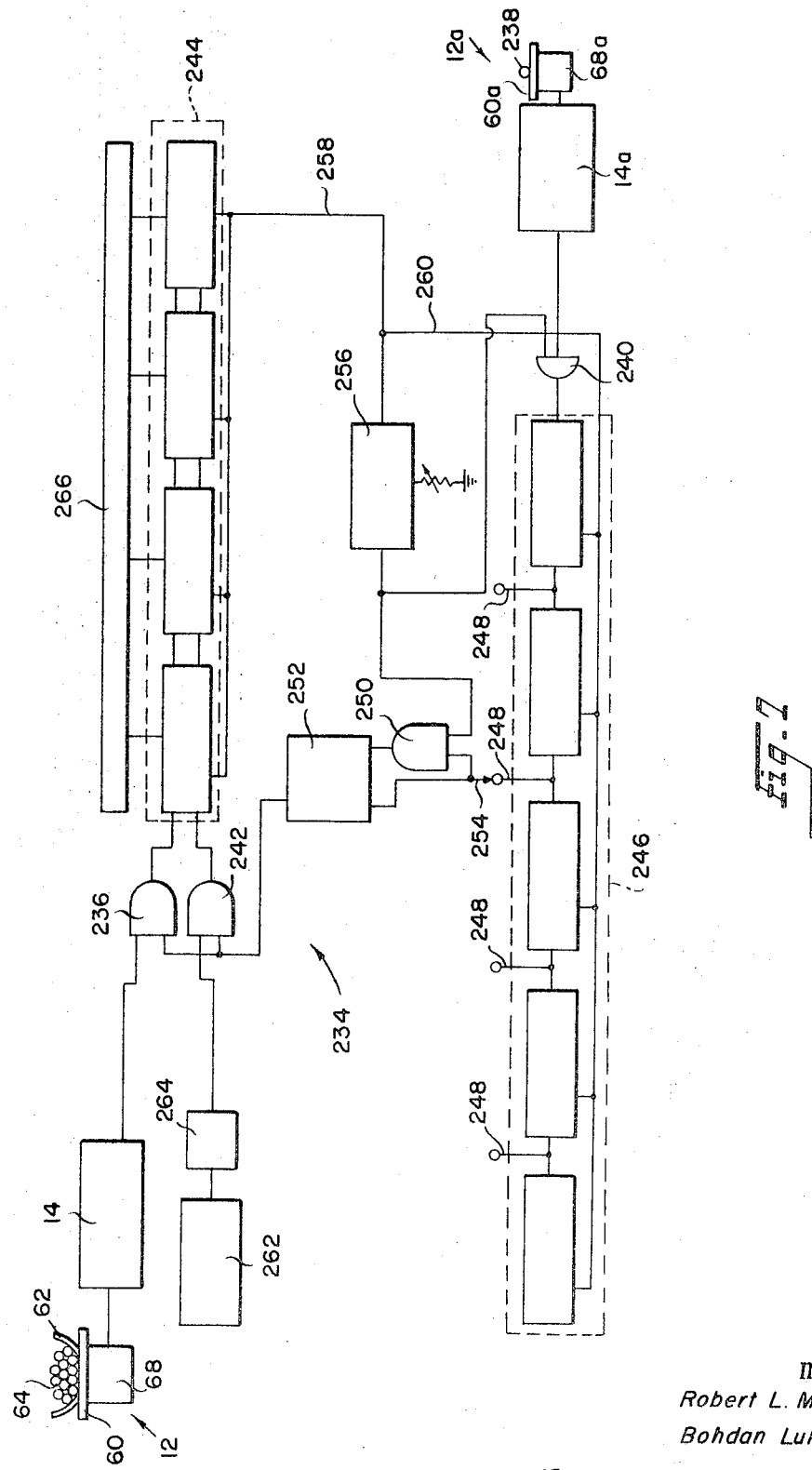

METHOD AND APPARATUS FOR CALCULATING A PIECE COUNT BY WEIGHING CALCULATIONS

BACKGROUND OF THE INVENTION

This invention relates to computing devices and methods generally, and more particularly to a novel and improved method and apparatus for determining by weight calculations the number of pieces in a container or the number of pieces to be added to a container.

For many years, attempts have been made to develop an effective apparatus for rapidly providing an accurate indication of the number of articles in a container without emptying the container and initiating a piece-by-piece count. It has been found that an article count may be achieved by weighing techniques, and mechanical and electromechanical devices have been developed for weighing and piece counting.

Mechanical piece-counting scales have generally operated on the basis of various balancing principles wherein a known number of articles of the type to be counted are employed as a counterbalance weight for a mechanical scale which receives the unknown number of articles. The resultant piece count must often be calculated by an operator employing indications provided by the scale, although in some instances, special scale dials and pointers are used to indicate a final piece count.

Mechanical piece-counting scales are usually of limited utility, for often they may be employed only for counting purposes. Also, mechanical counting scales are generally of limited capacity and require a relatively long operating period which renders such scales unsuitable for many modern industrial and other uses.

In an attempt to overcome the limitations inherent in mechanical counting scales, electrical and electromechanical piece-counting scales have been developed for article counting. These scales, although somewhat more accurate and versatile than the mechanical counting scales, are still subject to deficiencies which affect their suitability for use for many applications.

Electrical and electromechanical counting systems often employ load cells or other transducers which develop electrical input signals related both to the weight of the unknown number of articles to be counted and to a known number of such articles. These signals are then used to control an electrical system, such as a servosystem and potentiometer, which operates to achieve an electrical balance between input signals in much the same manner as the mechanical scales achieve a mechanical balance. These electrical balancing systems are subject to all of the errors and deficiencies known to servoloop systems such as, for example, servohunting, servoloop losses, etc., and also such errors are compounded by transducer signal variations. Additionally, these systems often require operating times which are excessive for many applications and are not operative with electrical weighing instruments having unlike calibration factors.

Recent advances in weighing technology have resulted in the development of accurate weighing systems having the capability to provide output signals in the form of digital or binary coded pulses which are indicative of the weight applied to a weighing platform. These systems operate with extreme rapidity and often average or integrate a plurality of weight samples to minimize the effects of transducer signal variations caused by moving loads.

The present invention contemplates a piece-counting method employing digital techniques which may be implemented by electrical or fluidic pulse producing weighing units combined with electrical or fluidic calculator systems. Although conventional electrical or fluidic components may be combined in the manner taught by this invention to accomplish piece counting, the invention also contemplates the use of a novel combination of components particularly adapted to meet the dictates of the piece counting method.

It is a primary object of this invention to provide a novel and improved piece count calculating method and apparatus for determining the number of pieces in a container by weight calculations.

Another object of this invention is to provide a novel and improved piece count method and apparatus adapted to incorporate the speed and accuracy of digital techniques to calculate a piece count by weight calculations.

A further object of this invention is to provide a novel and improved piece count calculating method and apparatus for determining the number of pieces to be added to a container.

Another object of this invention is to provide a novel and improved piece count method and apparatus for determining the number of pieces in a container or for determining when a desired number of pieces has been added to a container.

A further object of this invention is to provide a novel and improved piece count method adapted for implementation by electronic or fluidic circuitry.

Another object of this invention is to provide a novel and improved piece count method and apparatus for achieving a piece count indication in round numbers.

A further object of this invention is to provide a novel and improved piece count method and apparatus for developing a piece count from the output signals of two weighing units having unlike calibration factors.

Another object of this invention is to provide a novel and improved piece count apparatus for developing tare weight, gross weight, piece weight and net weight indications and employing such indications to calculate a piece count.

A further object of this invention is to provide a novel and improved piece count apparatus for developing pulse signals indicative of a number of weight factors and employing such signals in a calculator for acquiring either a piece count indication of the number of pieces in a container or an indication of when a desired number of pieces is added to a container.

Another object of this invention is to provide a novel round-off calculator adapted to automatically round off a calculated arithmetic result to the nearest whole number.

A further object of this invention is to provide a novel time base calculator for relating two input signals having different calibration factors to a common reference while employing such signals for an arithmetic calculation.

A still further object of this invention is to provide a novel and improved piece count apparatus for simultaneously obtaining an accurate weight indication and piece count indication of an unknown number of pieces within a container.

Other objects, features and attendant advantages of this invention will become apparent from a consideration of the following description taken in conjunction with the accompanying drawings in which:

FIG. 5 is a block diagram of a first embodiment of the round-off calculator employed for the piece-counting assembly of the present invention;

FIG. 6 is a block diagram of a second embodiment of the round-off calculator employed for the piece-counting assembly of the present invention; and FIG. 7 is a block diagram of the time base calculator employed for the piece counting assembly of the present invention.

Figure 1:
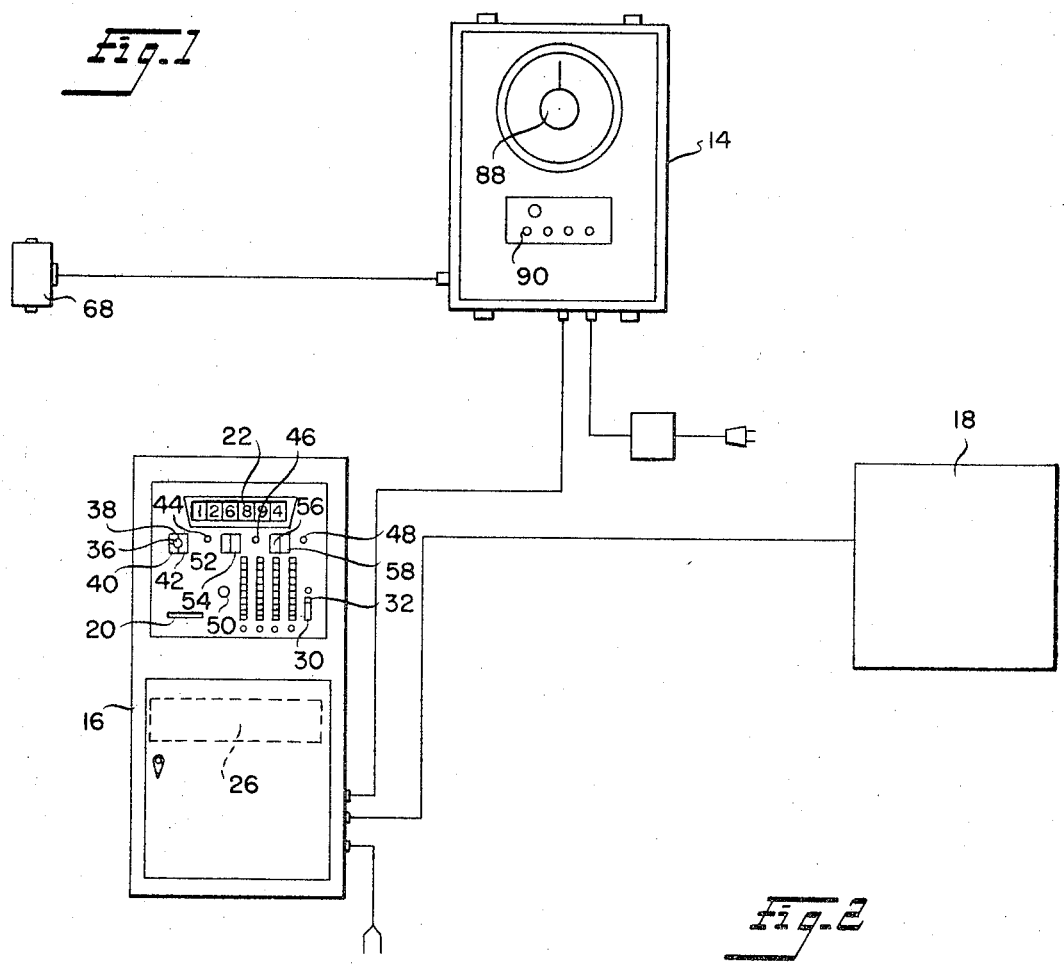
FIG. 1 is a diagrammatic illustration of the piece-counting assembly of the present invention including a view in front elevation of the control console for the assembly.

The piece counting method and system of the present invention employ arithmetic calculations to automatically determine the number of pieces in a container by weight calculations or when a desired number of pieces has been added to a container. Although this method of piece counting is particularly well adapted for implementation by electronic weighing and calculator systems of a type exemplified by the systems to be subsequently described, it is contemplated that this counting method might also be achieved by fluidic circuits designed to perform the weighing and calculator functions of corresponding electronic circuits. The calculators used to implement this invention operate with pulse input signals. These signals may be purely digital, binary coded decimal (BCD), or other coded pulse signals which, for purposes of this application, will be generally designated as "digital."

The basic piece counting method includes the steps of obtaining the gross weight of a container which contains an unknown number of pieces of substantially the same weight; obtaining the tare weight of the empty container and subtracting this tare weight from the gross weight to develop a net weight; obtaining the piece weight of one of the pieces of a known number of pieces, and dividing the net weight by the single piece weight to obtain the unknown number of pieces in the container. If the quotient obtained from dividing the net weight by the single piece weight is less than a whole number, the quotient is rounded off to the next highest whole number to provide an accurate indication of the unknown number of pieces. Also, if a known number of pieces is employed, the weight of these pieces is translated to a single-piece weight for the division.

The basic method may be implemented by an electronic or fluidic system which operates with signal values indicative of gross weight, tare weight and piece weight. These signal values may be directly obtained by weighing a loaded container, an empty container and a single or known number of pieces and transmitting signal values indicative of the magnitude of each weight directly to a calculator assembly. Generally, the piece weight and tare weight are preset or prerecorded and stored on a punched card or other known storage means which may be subsequently employed to generate a signal value indicative of the stored weight value. However, for other applications, only the tare weight is prerecorded or preset while the gross and piece weight signals are directly generated by two weighing assemblies.

The gross and tare weight signals are used to obtain a net weight signal, and the piece weight signal may then be employed to obtain from the net weight signal an indication of the number of pieces of like weight in the container. This may be accomplished by directly dividing the net weight signal by the piece weight signal in a suitable calculator system. If a known number of pieces are used as a reference, the weight signal must be translated to a single-piece weight signal before division occurs.

A digital calculation of the number of pieces within a container may be accomplished by generating pulse signals indicative of the gross, tare and single-piece weights and subtracting the tare weight signal from the gross weight signal to obtain a pulse signal indicative of net weight. The unknown number of pieces may then be found by directly dividing the net weight pulses by the single-piece weight pulses and rounding off the resultant pulse count to the next highest whole number if a count indication of less than a whole number is obtained, or by counting the net weight pulses for a time period determined by the single-piece weight pulses.

When operating with pulses in a digital calculation, it may be necessary to relate the unlike calibration factors of several pulse producing weighing units to a common reference. For example, the number of pieces within a container may be determined by weight calculations by simultaneously weighing both the loaded container and a single piece of like weight to those in the container. Each weighing function is accomplished by generating a signal which is variable in amplitude in response to variations in the magnitude of the respective weight taken and then converting these amplitude variable signals into digital pulse signals having a frequency related to the amplitude of the respective amplitude variable signal. However, due to the vast difference in weight between the filled container and the single piece, the digital pulse signal indicative of the full container weight must often be interpreted in accordance with a first calibration factor which differs from the calibration factor employed to convert the digital signal indicative of the much smaller single-piece weight to a weight indication. Therefore, the tare weight signal which may emanate from a recording medium upon which a tare weight has been prerecorded may be subtracted from the gross weight signal to obtain a net weight indication, but it is necessary to relate the diverse calibration factors to a common reference before the single piece weight signal can be employed to obtain an indication of a number of pieces from the net weight indication. Once the two calibration factors are related to a common reference, an accurate piece count may be achieved.

An arithmetic calculation may also be used to control the number of pieces to be added to an empty container. For this operation, the number of pieces to be placed in the container is used as the known factor and a single-piece weight or weight of a known number of pieces is obtained and either used directly or prerecorded. The signal indicative of the single-piece weight is then multiplied by a signal indicative of the desired number of pieces to obtain a net weight indication. The tare weight signal obtained by determining the container weight is then added to the net weight to achieve a desired gross weight indication. This desired gross weight can then be compared to the actual gross weight as pieces are added to the container to control container loading.

A better understanding of the method of the present invention will be obtained from a consideration of the novel weight-count calculating assemblies to be subsequently described.

PIECE COUNTING ASSEMBLY

Figure 2:
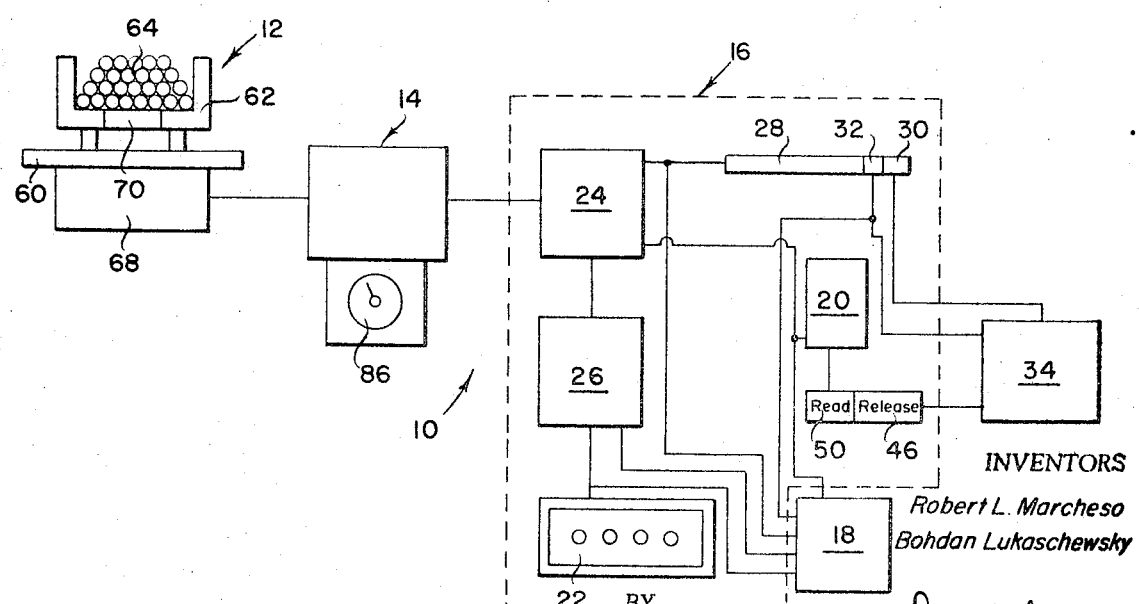
FIG. 2 is a block diagram of the piece-counting circuit for the assembly of FIG. 1.
Figure 3:
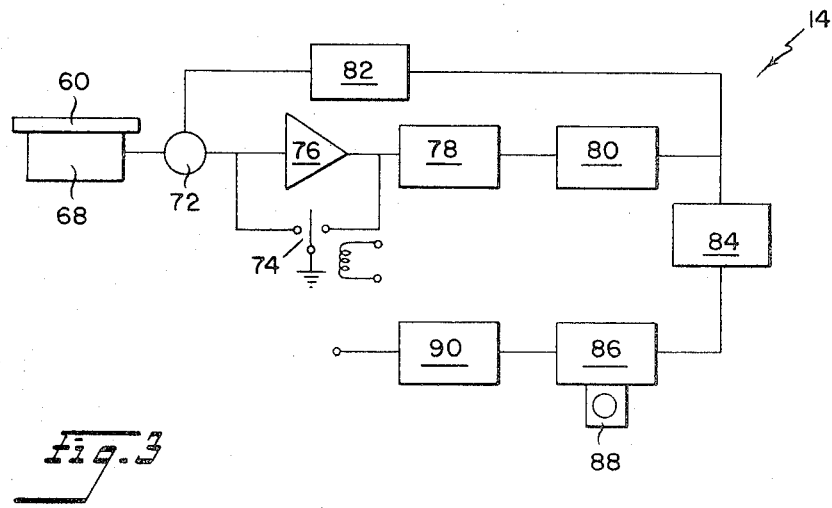
FIG. 3 is a block diagram of a force-measuring system which may be employed to provide the weight signals for the present invention.

The general structure of the novel piece-counting assembly employed to determine either the number of pieces in a container or the number of pieces to be added to a container by weight calculations may best be understood by reference to FIGS. 1—3, wherein it will be noted that the piece counting assembly, indicated generally at 10, includes a weighing station 12, a signal conversion section 14, a control console 16 and a card punch 18. These units operate to develop the data required for a piece count calculation.

The piece-counting assembly will first be described for use in connection with a towline cart system wherein the number of pieces contained in a chain of towline carts is sequentially calculated and recorded. Subsequently, the use of the same assembly as a control unit for determining the number of pieces to be added to a towline cart will be described.

It will become apparent that this assembly is adapted for many applications wherein either single or multiple sequential piece counts are required. The towline cart system is employed as an illustration of a type of container only, and it must be appreciated that the assembly and method of this invention are not limited in application to any specific type of container or article. For example, it is contemplated that this invention might be used with small articles and containers or, conversely, to determine the number of crates or other large articles in a moving boxcar.

The control console 16 constitutes the central intelligence station for the piece counting assembly 10, and all data employed in calculating a piece count is processed in the control console. The control console contains a card reader 20, a visual count display unit 22, a sequencer 24 and calculator 26, a keyboard 28, and associated operator control switches and indicators. The keyboard includes an accept key 30 and a reject key 32 if the piece counting assembly 10 is combined with a towline cart control system 34.

The operator control switches and indicators on the control console include control switches connected to control the operation of specific components of the piece counting assembly 10 and indicator lights connected in any suitable known manner to indicate the various operating conditions of the assembly. These control switches and indicators include a console power switch 36, a power on indicator light 38, a signal conversion and weighing section power indicator light 40, a system ready indicator light 42, a reset switch 44, a release switch 46, a start switch 48, a card reader operate switch and light 50, a part number indicator light 52, a tare weight indicator light 54, a net weight indicator light 56 and a piece weight indicator light 58. The release switch 46 may be omitted when the piece-counting assembly is not used in combination with the towline cart control system 34.

The weighting section 12 includes a weigh platform 60 to receive a towline cart 62 or other container for an unknown number of pieces 64 to be counted. The movement of the towline cart onto the weight platform and the subsequent routing of the cart is controlled by the towline cart control system 34.

A transducer 68, which for electrical systems will constitute a load cell, is suitably attached to the weigh platform 60 and functions to provide an output signal having a magnitude which is proportional to the force applied to the weigh platform. Thus the output of the transducer will constitute a signal of a magnitude proportional to the gross weight of the loaded towline cart 62. The weight of the unloaded towline cart or tare weight may be determined by a previous weighing operation and recorded on a tag 70 carried by the cart.

The output signal from the transducer 68 is provided as an input signal to the signal conversion section 14 and is converted thereby to a pulse output signal having a frequency which varies in response to variations in the amplitude of the input signal to the signal conversion section.

The signal conversion section 14 may be formed by any suitable electronic or fluidic unit for converting a weight to a pulse output. For example, conversion section 14 might well be formed by a force measuring system of the type defined by U.S. Pat. No. 3,324,962 to Donald G. Morrison. This system illustrated in FIG. 3, includes a summing node 72 which receives the output signal from the load cell transducer 68 and passes the signal to an electromechanical chopper 74. The chopper converts the signal to an AC waveform which is amplified by an amplifier 76 and reapplied to the chopper 74 to produce DC pulses which are directed to a DC operational amplifier 78. The operational amplifier amplifies and integrates the input pulse train to produce a direct voltage which varies according to the polarity and magnitude of the pulses. This direct voltage from the operational amplifier controls the output frequency of a voltage controlled oscillator 80; this frequency being proportional to the signal from the load cell transducer 68.

The output pulses from the oscillator 80 are fed back to a frequency to DC converter 82 to obtain a DC balancing signal for application to the summing node 72, and also to a frequency divider 84. The output of the frequency divider is applied to a gated counter 86, having a preselected time base, which produces a binary coded decimal output as well as a visual indication of gross weight upon an indicator 88. The output signal from the counter is applied to a decoder 90 which produces a digital output signal suitable for use as an input to the calculator 26.

In the operation of the piece-counting assembly 10, the signal conversion section 14 is energized by activating a power switch 92 and the signal conversion and weighing section indicator light 40 on the control console 16 comes on. The control console is energized by activating the console power switch 36, and the power on indicator light 38 will glow when the control console is receiving power.

When the piece-counting assembly components are ready to begin a counting cycle, the system ready indicator light 42 will come on. By pressing the release switch 46 on the control console, the towline cart control system 34 will remove a towline cart 62 which may have previously been positioned on the weigh platform 60 and replace this cart with a new cart containing an unknown number of pieces. The operator will then obtain the tare weight from the tag 70 on the new towline cart and key this data into the calculator 26 by means of the keyboard 28.

In a data card input system, the part number and piece weight of a single piece will be entered on a data storage card of a conventional type. This data storage card having a part number corresponding to the part number for the parts in the towline cart on the weigh platform is inserted into the card reader 20 and the card reader operate switch 50 is pressed. If the card is ready to be scanned, the card reader light will come on and the card reader will scan the card to obtain the part number and piece weight data.

To begin the weighing portion of the counting cycle, the start switch 48 is pressed and the cycle progresses under control of the sequencer 24. The gross weight of the towline cart is fed in the form of a pulse signal from the output of the decoder 90 to the calculator 26 and the indicator 88 provides a visual indication of the gross weight.

The part number appearing on the data storage card is sent from the card reader 20 to the card punch 18 where it is registered upon a data recording card, and the part number indicator light 52 comes on.

The tare weight from the keyboard 28 is simultaneously applied to the calculator 26 and is registered by the card punch 18 upon the data recording card. The tare weight indicator light 54 will come on when this phase of the counting cycle is complete.

With the gross weight and tare weight entered in the calculator 26, the calculator will perform a subtraction function to obtain a net weight which is applied to the card punch and registered thereby on the data recording card. The net weight indicator light 56 then comes on to indicate that this phase of the counting cycle is complete.

The piece weight stored on the data storage card is now simultaneously sent to the card punch 18 to be recorded on the data recording card and to the calculator 26. The piece weight indicator light 58 will glow to indicate that this function has been completed.

Upon receipt of the piece weight signal, the calculator will divide the net weight by the piece weight to determine the piece count to the nearest whole number. This piece count is registered by the card punch 18 and is displayed on the visual count display unit 22. The entire counting cycle has now been completed and the appropriate data is entered on the data recording card. The reset switch 46 may now be pressed to prepare the calculator for a new count.

It will be noted that for towline cart operation, the keyboard 28 is provided with an accept key 30 and a reject key 32. At the beginning of the counting cycle, the operator inspects the contents of the towline cart 62 and, if the cart is accepted, the accept key is pressed to cause the cart to be routed by the towline cart control system 34 to an appropriate assembly area. If the cart contents are not acceptable, the reject key is pressed and the towline cart control system routes the cart to a reject area. When a cart is rejected, this information is registered by the card punch 18 on the data recording card.

The same piece-counting assembly 10 may be effectively utilized as a control unit to fill a container, in this case the towline cart 62, with a specified number of articles. For this purpose, an empty cart is placed on the weigh platform 60 and the tare weight and piece weight are entered in the calculator 26 in the manner previously described. Also, the number of pieces to be introduced into the cart is entered into the calculator from the data storage card or from any similar signal generating source such as the keyboard 28 or a variable piece number setting unit, not shown. The start switch 48 is then pressed and the cycle progresses under control of the sequencer 24.

The calculator 26 multiplies the piece weight by the number of pieces to be introduced into the towline cart to obtain the desired net weight of the cart. Then the calculator adds the tare weight to this net weight and provides a desired gross weight indication on the visual count display unit 22. By noting this desired gross weight indication and observing the increasing gross weight indication on the gross weight indicator 88 as the cart 62 is loaded, the operator can determine when a desired number of articles have been placed in the cart.

Figure 4:
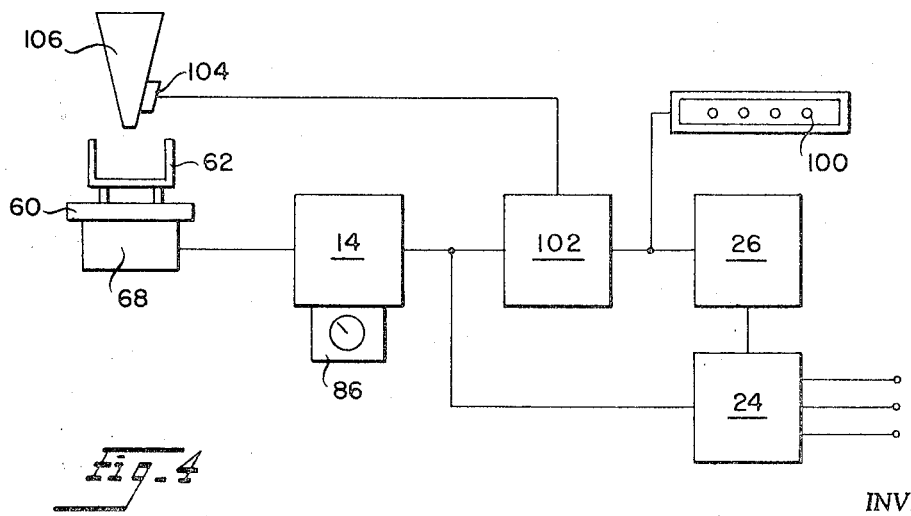
FIG. 4 is a block diagram of an embodiment of the present invention adapted to provide automatic container loading.

For automatic container loading, the calculator 26 is set to operate in the manner described to determine and indicate the desired gross weight. The tare weight, desired number of pieces, and piece weight are fed by means of input leads 98 and the sequencer 24 to the calculator 26. The desired gross weight determined by the calculator is displayed by a visual gross weight display unit 100 and is also entered in a comparator 102, as illustrated in FIG. 4. This comparator may constitute an up-down counter or any one of a number of other known comparison units which operate to provide an output signal when two input functions become equal.

With the desired gross weight entered in the comparator 102, an automatic control valve 104 may be activated to permit articles to fall from a storage hopper 106 into the towline cart 62. The valve 104 may be automatically activated by a signal from the comparator 102 occuring when the desired gross weight is entered therein, or manually activated by an operator controlled switch. It must be understood that the valve 104 and hopper 106 are merely illustrative of a number of automatic loading units which may be controlled by the piece-counting assembly 10.

The discharge of articles from the hopper 106 into the towline cart 62 results in an increasing gross weight output signal from the signal conversion system 14. This output signal is entered in the comparator 102, and when it equals the desired gross weight signal from the calculator 26, a stop pulse is sent from the comparator to close the valve 104. The towline cart will now contain the programmed number of articles originally set into the calculator 26.

The the piece-counting assembly 10 of the present invention is extremely versatile, and it must be noted that numerous modifications in both operation and assembly components may be accomplished within the scope of the invention. For example, a tare weight calculation in the calculator 26 might be eliminated by zeroing the scale prior to weighing and compensating for tare weight at the scale. This is a known method for tare weight compensation, and might be accomplished by adjusting the power supply for the load cell 68 or otherwise prebalancing the scale by means of a balance control 96 (FIG. 1).

It must also be recognized that the piece-counting assembly 10 can be effectively constructed from a combination of known fluidic circuit components. In a fluidic system, the electrical output of the load cell 68 could be converted to a related fluid signal by a fluid conversion system of known type incorporated in the signal conversion section 14. This fluid signal would in turn be converted within the signal conversion section to a fluid pulse signal. The second signal conversion could be accomplished by a fluid analogue to digital converter combined with a fluid encoder unit.

Alternatively, the load cell 68 might be replaced by a fluid transducer which directly converts force or mechanical movement to a related fluid output signal.

The pulse output from the fluidic signal conversion section 14 would be directed to a sequencer 24 for a fluidic calculator 26. The sequencer would be formed by a fluidic shift register or similar sequencing unit commonly employed to control the sequence of fluid input signals to a digital fluidic calculator. The calculator 26 might constitute any one of a number of known fluidic calculators having the capability to perform the arithmetic operations previously described. Ideally, this calculator could be formed by two fluidic counters and an up-down fluidic counter arranged in the manner to be subsequently described with reference to FIGS. 5 and 7.

The tare weight, piece weight, and desired number of article indications previously described could be converted to electrical signals by the card reader 20 or keyboard 28 as with an electrical system and then converted to fluid signals by a fluidic converter for application to the fluidic sequencer and calculator. The fluidic calculator could then utilize the signals to compute a piece number or desired gross weight.

ROUND-OFF CALCULATOR

The calculator 26 which is employed to determine the piece number or desired gross weight indication by weight calculations is preferrably, for electrical operating systems, a solid-state calculator capable of utilizing the gross weight, tare weight, piece weight, net weight and desired number of article values previously described to obtain an indication. Although various digital calculators conventional to the art may be incorporated in the console 16 for this purpose, such calculators are generally not adapted to adequately provide a solution to certain specific problems presented by a piece count situation.

In the determination of a piece count, it is desirable for the count indication to be finally displayed in whole numbers. Certain factors which inevitably occur in piece-counting situations, such as circuit losses, circuit variations, slight piece weight variations, etc. often result in a final calculator piece count which is less than a whole digit. Conventional calculators discard this remainder and display the next lowest digit which, in a piece count situation, would be an erroneous indication in many instances. For an accurate piece count indication, it is necessary to employ a calculator which will round off the piece count indication to the nearest whole digit.

Referring to FIG. 5, a round-off calculator circuit indicated generally at 108 is provided which is capable of accurately fulfilling the requirements of a piece count system. This round-off calculator circuit receives the gross weight, piece weight and tare weight signals developed in other sections of the piece-counting assembly 10 and subtracts the tare weight from the gross weight to obtain a net weight indication. The calculator then divides the net weight by the piece weight to obtain a piece count indication.

Alternatively, the same calculator receives the piece weight, tare weight and desired piece number indication and multiplies the desired piece number by the piece weight to obtain a net weight. The calculator then adds the tare weight to the net weight to obtain a desired gross weight.

In performing the arithmetic subtraction and division functions, the calculator 108 follows a basic approach of first completing the required single subtraction operation and then accomplishing a division by a series of subtractions. However, before registering the results of the division, the calculator automatically rounds the answer off to the nearest whole digit.

The input to the calculator 108 is controlled by the sequencer 24 which includes a calculator power supply and a sequence counter connected to a plurality of shift registers in a known manner to schedule the application of the various inputs to the calculator. It is apparent that the sequencer 24 could constitute any one of a number of known circuits commonly employed to control the application of a plurality of inputs to a digital calculator.

To aid in understanding the interaction between the various components of the calculator 108, dotted line connections have been shown in FIG. 5 to indicate major sequencer connecting circuits.

The primary components of the calculator 108 are a large scale register 110, a small scale register 112, and a piece count register 114. These binary registers with their associated logic circuitry may be formed by various conventional components, and only the novel logic combination will be described.

At the beginning of a piece number calculating cycle, the registers 110 and 112 will be zeroed through the action of the reset switch 44 during the previous calculating cycle. The reset switch controls the operation of a suitable reset pulse generator (not shown) which supplies a control signal for resetting the registers 110 and 112 in the conventional manner. This reset signal is applied by means of a reset line 116 to the zero input of each register unit of the small scale register 112 and by means of a reset line 118 to the zero input of each register unit of the large scale register 110. The reset signal is also applied by means of a preset line 120 to a flip-flop circuit 122 for a purpose to be subsequently described.

With the large and small scale registers 110 and 112 zeroed and the necessary input data for the calculator 108 preset at the inputs thereof, the calculating cycle may be initiated by the sequencer 24. First, the gross weight developed by the weighing section 12 is entered in the large scale register 110. The gross weight data present at data input lines 124 is entered in the large scale register by input logic gates 126 upon receipt thereby of a strobe signal provided by strobe line 128 from the sequencer 24.

Subsequently, the sequencer 24 provides a strobe signal to input logic gates 130 for the small scale register 112, and tare weight data present at data input lines 132 is entered in the small scale register.

The large and small scale registers are formed by suitable countdown counters which, for illustrative purposes, are shown as decade counters in FIG. 5. It will be noted that the tare and gross weight data is entered into the most significant decades of these registers, and that these decades are preceded by a tare gate 134 in the large scale register and a tare gate 136 in the small scale register.

To obtain a net weight from the gross and tare weight data entered in the large and small scale registers, the sequencer 24 simultaneously passes clock pulses from a master clock oscillator 138 to a clock tare line 140 connected to the tare gate 134 and to a clock tare line 142 connected to the tare gate 136. The tare gates 134 and 136 open simultaneously to permit the clock pulses to drive the large and small scale registers toward zero.

The clock pulses through the tare gate 136 drive the small scale register 112 to zero while the large scale register 110 still maintains a remainder count which is indicative of net weight. Upon the zeroing of the small scale register, a tare zero output gate 144 changes state and sends a stop pulse to discontinue the clock pulses through the tare gates 134 and 136. These tare gates now block the introduction of additional clock pulses from the clock tare lines 140 and 142.

Subsequent to the zeroing of the small scale register, the sequencer 24 provides a strobe signal by means of a strobe line 146 to input logic gates 148, and these gates change state to enter piece weight data present at the input lines 150 in the small scale register. Upon the entry of the piece weight data, the count down of the large and small scale registers is again initiated. However, for this second countdown, clock pulses from the master clock oscillator are simultaneously provided to the large and small scale registers by means of clock pulse lines 152 and 154.

The large and small scale registers 110 and 112 operate to divide the net weight by the piece weight by accomplishing a number of successive subtractions. Thus, after the clock pulses are initiated over the clock pulse lines 152 and 154, the small scale register is soon driven to zero and a small scale zero output gate 156 is caused to change state and provide an output signal to the sequencer 24. This output signal operates between clock pulses to cause a one count to be entered into the piece count register 114 and to trigger a pulsing unit 158. This pulsing unit, when triggered, feeds a strobe signal across the strobe line 146 so that the piece count data at the data input lines 150 is reentered in the small scale register 112.

In a conventional digital calculator, this series of subtractions would continue until the large scale register 110 is driven to zero. At this point, a large scale zero output gate 160 changes state and provides a stop signal to the sequencer 24 to terminate the clock pulses on the clock pulse lines 152 and 154. The count entered in the piece count register 114, which for illustrative purposes is shown as an up-count decade counter in FIG. 5., would then constitute the piece count obtained from dividing the net weight by the piece weight.

Although the round-off calculator 108 follows this general mode of operation to achieve a piece count, a novel innovation is includes in the calculator structure to automatically round off the final piece count to the nearest whole digit. This is accomplished by means of the flip-flop 122 and a divider flip-flop 162.

The divider flip-flop 162 receives the clock pulses from the clock pulse line 152 and provides one output pulse to the large scale register 110 for every two clock pulses received. Thus, it will be apparent that during the division cycle the large scale register is driven at one half the clock rate of the small scale register. Normally, this would mean that the piece count register 114 would register twice the number of subtractions needed to drive the larger scale register to zero, and the piece count entered would be twice that of the true piece count. However, this does not occur in the round-off calculator 108, for the piece count pulses from the sequencer 24 are fed to the flip-flop 122 which provides an output pulse to the piece count register for each two input pulses.

It will be recalled that the flip-flop 122 received the reset pulse on the preset line 120 before the calculating cycle was initiated. This pulse preset the flip-flop 122 with one count, so that when the small scale register zeros for the first time during the division cycle, a full count is entered in the piece count register. Thus the flip-flop 122 causes one count to be entered in the piece count register upon the occurrence of the first output signal from the small scale zero output gate 156, and subsequently causes one count to be registered upon the occurrence of every second output signal from the small scale zero output gate. This results in the rounding off to the nearest whole digit of the count registered in the piece count register 114.

The piece count output may be taken from the piece count register 114 by any suitable output unit. For illustrative purposes in FIG. 5, output drive units 164, which may constitute stepping switch drivers, are activated by a driver switch 166 to deliver the piece count data from the piece count register 114 to a suitable indicator.

To perform multiplication and addition in the computation of a desired gross weight for container filling purposes, the calculator 108 operates basically in the same manner previously described. First, the desired number of pieces must be multiplied by the single-piece weight and the product entered as a net weight in the single-piece register 114. To accomplish this multiplication, the desired number of pieces would be set into the large scale register 110 in the same manner that the gross weight was previously set into the same register. This can be achieved by switching the data input lines 124 to receive a data input from a source controlled by a desired piece number indication punched on a data card or otherwise set into the calculator.

The piece weight is set into the small scale register in exactly the same manner as previously described and the calculator 108 is then prepared for a multiplication. However, to multiply the data in the large scale register by that in the small scale register, the clock pulses from the master clock oscillator 138 must be employed in a manner slightly different from the manner in which such pulses were used for subtraction and division. To accomplish this change, the sequencer 24 will include appropriate logic switching circuitry which, for purposes of illustration only, is depicted by the double-pole switch 168 in FIG. 5.

During the subtraction and division cycle of the calculator 108, the switch 168 is connected as shown in FIG. 5 to simultaneously provide clock pulses to the clock pulse lines 152 and 154. The switch also provides an input signal to the flip-flop 122 each time an output signal is generated by the small scale zero output gate 156 upon the zeroing of the small scale register.

For multiplication and addition, the switch 168 is moved to contacts 170. In this position, clock pulses are simultaneously directed to the clock pulse line 154 and to a second direct clock pulse line 172 which forms an input to the register 114.

In completing the multiplication of the single-piece weight by the desired piece number indication, clock pulses are simultaneously provided by means of the clock pulse input lines 154 and 172 to the small scale register 112 and the piece count register 114. Each such clock pulse drives the small scale register toward zero while entering a one count in the piece count register.

When the small scale register zeros, the small scale zero output gate 156 provides a signal which causes the pulsing unit 158 to reenter the single-piece weight in the small scale register. Also, the signal from the small scale zero output gate is directed as a clock pulse by the switch 168 to a clock pulse line 174 for the large scale register. Thus, each time the small scale register zeros, the large scale register is driven one count toward zero and a single-piece weight count is recorded in the piece count register. This action continues until the large scale register zeros and the large scale zero output gate 160 sends a stop signal to the sequencer 24.

It will be apparent that during the multiplication cycle of the calculator 108, a complete single-piece weight indication is entered in the piece count register 114 for each count stored in the large scale register 110. Therefore, when the large scale register zeros, the piece count register contains the product of the single piece weight times the desired piece number. This product constitutes the desired net weight.

To develop an indication of the desired gross weight, the calculator 108 must add the tare weight to the net weight indication. This is accomplished by entering the tare weight into the small scale register after the multiplication cycle is completed. The sequencer 24 provides a strobe signal across the strobe line 128 to enter the tare weight in the same manner as previously described in connection with the subtraction and division cycle of the calculator. The sequencer then provides clock pulses across the clock tare line 142 to drive the small scale register to zero, and the same clock pulses are entered by means of the clock input line 172 in the piece count register 114. When the small scale register zeros, the tare zero output gate 144 will provide a stop signal to the sequencer 24, and the piece count register will contain the sum of the net weight and tare weight.

As previously indicated, the single-piece weight may be provided to the calculator 108 directly from a second weighing assembly which is substantially identical to the assembly illustrated in FIG. 3. Normally, any calibration difference between the two weighing assemblies employed to provide the gross weight and piece weight indications to the calculator 108 can be resolved by adding "dummy" decades to the appropriate calculator registers. However, it is often desirable to weight more than a single piece to provide the known piece weight indication, and the calculator 108 of FIG. 5 is not adapted to provide an accurate output indication when the weight of more than a single piece is entered into the small scale register.

Referring now to FIG. 6, an embodiment of the calculator of FIG. 5 is shown as indicated generally at 176. This calculator operates basically in a manner similar to that of the calculator 108, and like reference numerals will be employed to denote common components. However, the calculator 176 is also adapted to automatically calculate a piece number when the inputs to the calculator are provided by a first weighing instrument supporting an unknown number of pieces and a second weighing instrument supporting a plurality of pieces of known number. Additionally, when two weighing inputs are employed, it is often desirable to take the known number of pieces from the large container of pieces on the first weighing instrument, so the calculator 176 must automatically add the number of pieces on the second weighing instrument to obtain an accurate final piece count calculation. The arithmetic calculation performed by the calculator 176 is based upon the following formula:

$$\frac{(A+B)-C}{B/N} = \text{unknown number of pieces}$$

$A$ = Gross weight of unknown number of pieces
$B$ = Weight of known number of pieces
$C$ = Tare weight
$N$ = Number of pieces on second scale The calculator 176 includes three registers 178, 180 and 182. The register 178 is formed by an up-count decade counter; the register 180 is formed by a bidirectional up-down count decade counter; and the register 182 is formed by a down-count decade counter. The registers 178 and 180 are fed by the flip-flop units 122 and 162 so that these registers perform a round off function in the same manner as previously described in connection with the calculator 108.

In the operation of the calculator 176, the registers 180 and 182 are reset by a reset signal on the reset lines 116 and 118, while the flip-flop unit 122 is preset by the preset line 120. Then a container of pieces to be counted is placed on a first pulse-producing scale unit and a known number of pieces is taken from the container and placed on a second pulse-producing scale unit. The number of pieces on the second scale is set into the calculator 176 by a number unit 184, which may constitute a manual unit such as thumbwheel operated switches or a card reader. It will be noted that the output from the number unit is fed to input logic gate circuitry indicated at 186 for the register 182 and is entered into the registry by this input logic gate circuitry upon receipt thereby of a strobe signal from the sequencer 24 across a strobe line 188.

The sequencer 24 causes the number of pieces from the piece number unit 184 to be set into the register 182, and at the same time the weight of this known number of pieces, which is developed by the second scale unit and fed to data input lines 190 for register input logic gate circuitry 192, is entered in the register 180. This is accomplished under the control of the sequencer 24 which sends a strobe signal along a strobe line 194.

With the known piece number entered in register 182 and the weight of the known number of pieces entered in register 180, the calculator 176 executes a division cycle by performing a number of subtractions in the manner previously described in connection with the calculator 108. The sequencer 24 simultaneously sends clock pulses from the master clock oscillator 138 along a clock line 196 to the register 182 and across the clock pulse line 152 to the flip-flop 162 and register 180. Each time the register 182 zeros, a zero output gate 198 provides a signal to the flip-flop 122 and a trigger signal to the pulsing unit 158. The pulsing unit causes the known piece number to be reentered into the register 182, and the countdown continues until the register 180 zeros.

When the register 180 counts down to zero, a zero output gate 200 changes state and directs a stop signal to the sequencer 24. The register 178 now contains a quotient derived from dividing the weight of the known of pieces by the piece number, and this quotient constitutes the weight of a single piece $\left(\frac{B}{N}\right)$ The sequencer 24 strobes the single piece weight from the register 178 into the memory decades of a memory unit 202. This is accomplished by a strobe signal from the sequencer which passes across a strobe line 204 to cause a register output logic circuit 206 to enter the single piece weight into the memory unit.

The calculator 176 now begins an addition cycle to obtain the sum of the gross weight and the weight of the known number of pieces. The weight of the known number of pieces, which is also present at data input lines 208, is entered into the register 182 by input logic gates 210 upon receipt thereby of a strobe signal provided by the sequencer 24 across a strobe line 212. Also, the gross weight from the first scale unit is directed to data input lines 214, and a strobe signal on a strobe line 216 causes input logic gates 218 to enter this weight into the register 180. Clock pulses are again provided to zero the register 182, while the same clock pulses are simultaneously fed by an input line 220 to the register 180. Each clock pulse causes this register to count up one count, so that when the register 182 counts down to zero and a zero output gate 222 changes state to send a stop signal to the sequencer 24, the register 180 will contain the product of the gross weight and the weight of the known number of pieces (A + B).

The next function of the calculator 176 is to derive (A + B) − C, and this requires another subtraction. The tare weight present at data input lines 224 is passed into the register 182 by input logic gates 226 when the sequencer 24 provides a strobe signal on a tare strobe line 228. Clock pulses from the sequencer along clock line 196 drive the register 182 toward zero, and the same clock pulses passing along clock tare line 140 and through tare gate 134 cause a similar countdown in the register 180. When the register 182 zeros, a tare zero output gate 230 sends a stop signal to the sequencer, and the register 180 contains $(A+B)-C$.

The final operation of the calculator 176 involves the division of the indication now present in the register 180 by that stored in the memory unit 202 $\frac{(A+B)-C}{B/N}$ The sequencer 24 activates the memory unit through a memory input line 232, and the material in the memory unit is entered into the decades of the register 182. Also, a one count is again set into the flip-flop 122 by the sequencer. A division as previously described is started with clock pulses passing into the flip-flop 162 and along the clock line 196. Each time the register 182 zeros, the zero number output gate 198 sends a one count to the flip-flop 122 and triggers the pulsing unit 158 to reset the register 182 from the memory unit 202. When, after successive countdowns of the register 182, the register 180 zeros, a final stop pulse is sent by the zero output gate 200 to the sequencer 24. An accurate count of the unknown number of pieces rounded off to the nearest whole digit is now present in the register 178. This count includes the pieces used on the second scale unit.

TIME BASE CALCULATOR

For some applications, it is desirable to simplify the calculator 26 of the piece-counting assembly 10 so that an accurate piece count may be directly derived from weight indications provided by two weighing units. As in the case of the calculator of FIG. 6, these weighing units may each constitute a unit similar to that of FIG. 3, or, in the alternative, other pulse producing weighing units of a known type may be used.

The weighing unit employed to obtain the gross weight of a container holding an unknown number of pieces will be identical to the sections 12 and 14 of FIG. 2 which were used for a similar purpose. This weighing unit might be characterized as a large scale unit, for it must normally be adapted to accept weights of a greater magnitude than the second weighing unit which receives only a single piece or small known number of pieces. This second, or small scale unit, is identical in construction to the large scale unit, but the output therefrom is generally provided in accordance with a calibration factor which differs from that of the large scale unit. For example, the output of the large scale unit might be $$f1 \alpha k1 \frac{\text{pulse/pound}}{\text{second}}$$ where $f1$ is frequency and $k1$ is a calibration factor which, for purposes of description, will be set at $\frac{(1) \text{ pulse/pound}}{\text{second}}$ It will be understood that the calibration factors for the large and small scale units can be set at any desired value.

The output of the small scale unit is a signal whose frequency $f2$ is indicative of piece unit weight, and therefore $f2 \alpha k2$ $$\frac{\text{pulse/pound per piece}}{\text{second}}$$

Again, for purposes of description, the calibration factor $k2$ will be set at $\frac{(.01) \text{ pulse/pound per piece}}{\text{second}}$ To directly derive a piece count from the outputs of the large and small scale units, it is necessary to provide a calculator which is adapted to relate the calibration factors $k1$ and $k2$ to a common reference K. The time base calculator indicated generally at 234 in FIG. 7 operates to introduce a proportionately constant reference K where $K \alpha k1/k2$. The calculator determines the number (N) of pieces on the large scale unit in accordance with the formula $N \alpha \frac{f1}{f2} K$ The operation of the time base calculator 234 will be better understood by referring to FIG. 7, wherein the large scale unit including the weighing section 12 and signal conversion section 14 provides a gross weight signal to an input gate 236, while the small scale unit including weighing section 12a and a signal conversion section 14a provides a piece weight signal derived from a piece 238 to an input gate 240. The input gate 236, with a second input gate 242 forms the input logic circuit for a bidirectional up-down count counter 244, while the input gate 240 controls the input to a time base reference counter 246. The time base reference counter is provided with a plurality of decade output terminals 248, each terminal being connected to provide an output from the preceding counter decade or decades.

A selected decade output from the time base reference counter 246 is connected to an output gate 250 and a flip-flop circuit 252 by a preset, variable contact 254. The output gate and flip-flop circuit operate to control the input gates 236 and 242.

A pulse generator 256 is connected to the input gate 240 and the output gate 250, and is also connected by reset lines 258 and 260 to the respective decades of the counters 244 and 246. The pulse generator may constitute a multivibrator or a similar pulse producing circuit operative to provide control pulses for the calculator 234.

In the operation of the time base calculator, the setting of the variable contact 254 is determined by the ratio between the calibration factors for the large and small scale units. In the illustration previously given, this calibration factor ratio was 100:1, so the variable contact is set at the output 248 for the hundreds decade of the time base reference counter 246.

The counters 244 and 246 are cleared by a reset signal from the pulse generator 256 which is passed along the reset lines 258 and 260, and with the counters cleared, the calculator is prepared for operation. A start signal is now fed from the pulse generator to the input gate 240 and the output gate 250.

Upon receipt of the start signal the input gate 240 permits the output pulses from the small scale unit to pass into the time base reference counter 246. Simultaneously, the output gate 250 passes the start signal to the flip-flop 252 which changes state and opens the input gates 236 and 242. The input gate 236 permits the output pulses from the large scale instrument to pass into the bidirectional counter 244 and the counter is caused to count up from zero.

The input gate 242 is connected to a source of signal pulses which are indicative of the tare weight, and these pulses enter the bidirectional counter and drive the counter count back toward zero. Thus the tare weight will be subtracted from the gross weight in the bidirectional counter.

The tare weight pulses may emanate from a card scanner, keyboard or other suitable source. For purposes of illustration in FIG. 7, this source has been shown as a manually variable tare setting unit 262 which controls the output frequency of a variable oscillator 264.

The bidirectional counter 244 counts pulses from the large scale unit for a time period determined by the small scale unit driving the time base reference counter 246 to its set point. Once this point is reached, the output from the time base reference counter at the variable content 254 causes the flip-flop circuit 252 to change state and close the input gates 236 and 242. The piece count present in the bidirectional counter may now be read out by a suitable read out unit 266.

The time base reference counter operates effectively to relate the calibration factors of the large and small scale units to a common reference. Also, this counter may be used in some instances to compensate for the increased weight of multiple pieces on the small scale unit. For example, if the single piece 238 were to be replaced by 10 pieces, compensation could be automatically achieved by moving the variable contact 254 over to the next highest decade output.

The piece count assembly 10 and particularly the calculator units employed therewith may be modified in numerous ways to adapt the assembly for a specific use or environment. For example, decade-counting units have been illustrated in connection with each calculator embodiment disclosed herein, but it will be apparent to those skilled in the art that other known counter assemblies could be substituted for these decade units without materially altering the basic mode of operation of the calculator.

We claim:

1. A method for automatically determining a piece count by weight calculations which includes weighing an unknown number of pieces, converting the weight obtained in accordance with a first calibration factor to a first digital signal having a frequency indicative of the weight of said unknown number of pieces, weighing a known number of said pieces, converting the weight obtained for said known number of pieces in accordance with a second calibration factor to a second digital signal having a frequency indicative of said known number of pieces, adjusting a count registration means in accordance with the ratio between the calibration factors of said first and second digital signals to relate the calibration factors to a common reference, and simultaneously entering said first signal in a first registration means and said second signal in said adjusted registration means, said first signal being entered for a time period determined by the frequency of said second digital signal and the adjustment of said second registration means.

2. A method for automatically determining a piece count by weight calculations which includes weighing an unknown number of pieces, converting the weight obtained to a first digital signal indicative thereof, obtaining a second digital signal indicative of the piece weight of one of said pieces, entering said piece weight signal into a first register and said first digital signal into a second register, driving said first and second registers toward zero while reentering said piece weight signal into said first register each time said first register is zeroed and providing a count in response to each zeroing of said first register.

3. The method of claim 2 for automatically determining a piece count by weight calculations which includes rounding off said piece count to the nearest whole digit, such round-off being accomplished by driving said first register at twice the rate of said second register and entering the first of said counts in an output registration means while subsequently entering each successive second count in said output registration means.

4. The method of claim 2 which includes weighing a plurality of pieces of known number, converting said weight of said pieces to a third digital signal having a value indicative thereof, obtaining a fourth digital signal having a value indicative of the number of said known number of pieces weighed and comparing said third digital signal with said fourth digital signal to derive said second digital signal having a value indicative of the quotient of said third digital signal value by said fourth digital signal value.

5. A method for automatically determining the number of pieces in a container by weight calculations which includes obtaining a force indicative of the gross weight of a loaded container, converting the force indicative of container gross weight to a first signal indicative of said gross weight and having a signal value which varies in response to variations in the magnitude of said gross weight, obtaining a second signal having a signal value indicative of the tare weight of said container when empty, comparing said second tare weight signal with said first gross weight signal to obtain a third signal indicative of net weight and having a signal value equal to the difference in value between said first and second signals, obtaining a fourth signal having a signal value indicative of the weight of a known number of said pieces, and comparing said fourth signal with said third signal to obtain a fifth signal having a signal value indicative of the quotient of said third signal value by said fourth signal value, and converting said fifth signal value to a visual numerical indication.

6. The method of claim 5 which includes providing said third and fourth signals as digital signals, said fifth signal being formed by counting said third signal for a time period determined by said fourth signal.

7. The method of claim 5 which includes providing said first, second and fourth signals as digital pulses to obtain said third signal as a digital signal, the gross weight pulses of said first signal being provided by generating a signal which is variable in amplitude in response to variations in the magnitude of said container gross weight and converting said amplitude variable signal in accordance with a first calibration factor to a digital pulse signal having a frequency related to the amplitude of said amplitude variable signal, and said fourth piece weight signal pulses being provided by weighing a known number of said pieces and generating a second signal which is variable in amplitude in response to variations in the magnitude of the weight of said known number of pieces, and converting said second amplitude variable signal in accordance with a second calibration factor different from said first calibration factor to a second digital pulse signal having a frequency related to the amplitude of said second amplitude variable signal, said indication of the number of pieces in the container being obtained by counting said third signal for a time period determined by said fourth signal and adjusting said time period to relate said first and second calibration factors to a common reference.

8. The method of claim 5 wherein said first gross weight signal, second tare weight signal and fourth piece weight signal are derived as digital signals, said third net weight signal being obtained by entering said tare weight signal into a first register, entering said gross weight signal into a second register, and driving said first and second registers toward zero until said first register is cleared, said fifth signal being subsequently obtained by entering said piece weight signal into said first register, driving said first and second registers toward zero until said second register zeros while reentering said piece weight signal into said first register each time said first register is zeroed and entering a count into a third register for each zeroing of said first register.

9. The method of claim 5 which includes adjusting the signal value of said fifth signal to obtain a numerical indication to the next highest whole number when said fifth signal value is less than that required to produce such whole number but more than required to produce the next preceding whole number indication.

10. The method of claim 9 wherein said first gross weight signal, second tare weight signal and fourth piece weight signal are derived as digital signals, said third net weight signal being obtained by entering said tare weight signal into a first register, entering said gross weight signal into a second register, and driving said first and second registers toward zero until said first register is cleared, said fifth signal being subsequently obtained and adjusted in value by entering said piece weight signal into said first register, driving said first and second registers toward zero until said second register clears while reentering said piece weight signal into said first register each time said first register is zeroed, said first register being driven at twice the rate of said second register, and entering a count in a third register upon the first zeroing of said first register and subsequently entering a count into said third register upon each successive zeroing of said first register.

11. In a calculating assembly employing weight calculations, the combination comprising a weighing unit including signal producing means to provide a first digital signal indicative of the weight of an unknown number of pieces of substantially equal weight, means to provide a second digital signal indicative of the weight of a known number of said pieces, digital calculator means connected to receive said first and second digital signals, said digital calculator means including first register means to receive said first digital signal and second register means to receive said second digital signal, driving means to drive said first and second register means toward zero and reset means to reset said second register means to the initial value of said second digital signal each time said second register means reaches zero until said first register means zeros.

12. In a calculating assembly employing weight calculations, the combination comprising a weighing unit including signal producing means to provide a first digital signal indicative of the gross weight of a container filled with an unknown number of pieces of substantially equal weight, means to provide a second signal having a signal value indicative of the tare weight of said container when empty, digital calculator means connected to receive said first and second signals, said calculator means including first, second and third registration means, said first registration means operating to receive and register said first digital signal and said second registration means operating to receive and register said second digital signal, driving means to drive said first and second registration means toward zero until said second registration means first zeros means to provide a third digital signal indicative of the weight of a known number of said pieces to said second registration means subsequent to the first zeroing thereof, said driving means operating subsequent to the reception of said third digital signal by said second registration means to drive said first and second registration means toward zero and reset means to reset said second registration means to the initial value of said third digital signal each time said second registration means reaches zero until said first registration means zeros.

13. In a calculating assembly employing weight calculations, the combination comprising a first weighing unit for receiving a load formed by an unknown number of pieces of substantially equal weight, said first weighing unit including signal producing means to provide a first digital signal in accordance with a first calibration factor having a frequency indicative of the weight of the load on said first weighing unit, a second weighing unit for receiving a load formed by a known number of said pieces, said second weighing unit including second signal producing means to provide a second digital signal in accordance with a second calibration factor differing from said first calibration factor, said second signal having a frequency indicative of the weight of the load on said second weighing unit and calculator means connected to receive and register said first and second digital signals and operative to relate said first and second digital signals to a common reference, said calculator means including a first counter means operative to register a plurality of counts in response to said first digital signal, second counter means operative to simultaneously register a plurality of counts in response to said second digital signal, said second counter means operating upon reaching a preset count to terminate the count registration by said first counter means, and means for presetting said preset count into said second counter means in accordance with the ratio between said first and second calibration factors.

14. The calculating assembly of claim 13 wherein input gate means are provided to receive and control the provision of said first digital signal to said first counter means, said second counter means forming a time base counter having a counting rate directly related to the frequency of the second digital signal received thereby and including a plurality of outputs, each such output being connected to provide a count output signal upon registration by said second counter means of a specific count of greater magnitude than the count for causing a count output signal at the next preceding output, and gate control means for providing control signals to said input gate means to determine the pulse registration time during which said input gate means passes said first digital signal to said first counter means, said means for presetting said preset count into said second counter means including contact means movable between said second counter means outputs to select one of said outputs, said contact means being connected to provide a count output signal from a selected second counter means output to said gate control means.

15. The calculating assembly of claim 13 which includes means to provide a third digital signal having a frequency directly related to the weight of a container for said unknown number of pieces, said first counter means including a bidirectional counter means connected to simultaneously register counts in response to said first and third digital signals, said bidirectional counter means being driven by said third digital signal to decrease the count registered in response to said first digital signal.

16. In a calculating assembly employing weight calculations, the combination comprising means to provide a first digital signal indicative of a number of pieces of substantially equal weight for a container, means to provide a second digital signal indicative of the piece weight of a known number of said pieces, digital calculator means connected to receive said first and second signals, said calculator means including first, second and third registration means, said first registration means operating to receive and register said first digital signal and said second registration means operating to receive and register said second digital signal, driving means to provide pulses to drive said second registration means to zero and simultaneously to provide an equal number of pulses for registration by said third registration means, pulsing means to provide a pulse to drive said first registration means toward zero upon each zeroing of said second registration means, and reset means to reset said second registration means to the initial value of said second digital signal each time said second registration means reaches zero until said first registration means zeros.

17. The calculating assembly of claim 16 which includes means for providing a third digital signal indicative of the weight of a container for said pieces to said second registration means after the zeroing of said first and second registration means, said driving means operating after the registration of said third digital signal to provide pulses to drive said second registration means to zero and simultaneously provide an equal number of pulses for registration by said third registration means, and output means operating to provide a calculator output signal indicative of the count registered by said third registration means.

18. The calculating assembly claim 17 which includes a weighing unit supporting said container, said weighing unit including means to provide a weight output signal indicative of the weight applied to said weighing unit, and comparator means to compare the output signal from said weighing unit with the output from said digital calculator means.

19. The calculating assembly of claim 18 wherein said comparator means provides a control signal to a piece loading unit when the output from said second weighing unit is equal to the output from the output means for said digital calculator means.

20. A calculating assembly employing weight calculations comprising a control console including means to initiate a calculation cycle, input means to provide signals characteristic of at least one known value, calculator means connected to receive said known value signals, said calculator means being adapted to provide a result derived from at least two arithmetic calculations, and indicator means connected to said calculator means and operative to register the result of calculations performed thereby, and at least one weighing unit connected to said console, said weighing unit including a weigh platform and signal producing means connected to provide an output signal to said calculator means characteristic of the weight of a load on said weigh platform.

21. The calculating assembly of claim 20 wherein an unknown number of pieces of substantially equal weight is applied to said weigh platform, said input means being operative to provide a signal indicative of a piece weight of a known number of said pieces to said calculator means, and said calculator means being operative upon the initiation of a calculating cycle to cause said indicator means to indicate, to the nearest whole digit, the number of pieces in said container.

22. The calculating assembly of claim 20 wherein said input means operates to provide a first signal indicative of a desired number of pieces to be applied to said weigh platform and a second signal indicative of the weight of a known number of said pieces, said calculator means being operative upon the initiation of a calculating cycle to cause said indicator means to indicate the weight for said desired number of pieces and to provide when such desired weight is applied to said weigh platform.

23. The calculating assembly of claim 20 wherein a second weighing unit is connected to said console, said second weighing unit including a second weight platform and second signal producing means to provide an output signal to said calculator means characteristic of a load on said second weigh platform, said second signal producing means operating to provide an output signal in accordance with a calibration factor differing from the calibration factor for the output signal of said other signal producing means, said calculator means operating to relate said unlike calibration factors to a common reference.

24. In a calculating assembly employing weight calculations, the combination comprising a weighing unit including signal producing means to provide a first digital signal having a value indicative of the weight of an unknown number of pieces of substantially equal weight, means to provide a second digital signal having a value indicative of the weight of a known number of said pieces, and digital calculator means connected to receive and compare said first and second digital signals to provide an output signal having a value indicative of the quotient of said first signal divided by said second signal, and numerical indicator means driven by said output signal to provide a numerical indication, said digital calculator means including means to adjust the value of said output signal to obtain a numerical indication by said numerical indicator means to the next highest whole number when said output signal value is less than that required to produce such whole number but more than that required to produce the next preceding whole number.

25. The calculating assembly of claim 24 wherein said digital calculator means includes dividing means adapted to employ said first digital signal as a dividend factor and said second digital signal as a divisor factor and to provide two output signals for each time said divisor factor goes into said dividend factor, quotient registration means, and round-off control means operative to receive said output signals from said dividing means, said round-off control means operating to register one count in said quotient registration means upon receipt of the first output signal from said dividing means and to subsequently register one count upon each receipt of two of said output signals.

26. The calculating assembly of claim 25 wherein said round-off control means includes signal translating means connected to receive said output signals from said dividing means, said signal translating means operating to provide a single signal to said quotient registration means upon the receipt thereby of two input signals and input control means operative to feed a single input signal to said signal translating means before the receipt thereby of the output signals from said dividing means.

27. The calculating assembly of claim 26 wherein said signal translating means is formed by a flip-flop unit.

28. The calculating assembly of claim 27 wherein said dividing means includes first registration means connected to receive said first digital signal and register said dividend factor, second registration means connected to receive said second digital signal and register said divisor factor, said second registration means operating to provide an output signal to said round-off control means upon clearance of said divisor factor therefrom, reset means operating to reset said divisor factor into said second registration means upon each clearance thereof until zeroing of said first registration means, and driving means connected to drive said first and second registration means toward a zero clear state, said driving means operating to drive said second registration means at twice the rate of said first registration means.

29. The calculating assembly of claim 28 wherein said second digital signal is characteristic of a single piece weight, said means to provide said second digital signal including means to provide a third digital signal characteristic of the weight of a plurality of pieces of known number, signal generating means operative to provide a fourth digital signal characteristic of the number of pieces employed to obtain said third digital signal, and signal storage means connected to said second register means, said second register means operating to receive said third digital signal and said first register means operating to receive said fourth digital signal, said driving means subsequently operating to drive said first and second register means toward zero and said reset means operating to reset said second register means to said third digital signal value each time said second register means reaches zero, said signal storage means being connected to receive and store a signal indication derived from the output signals from said second register means provided before said first register means reaches zero and to subsequently provide said signal indication as said second digital signal.

UNITED STATES PATENT OFFICE
CERTIFICATE OF CORRECTION

PATENT NO. : 3,552,511
DATED : January 5, 1971
INVENTOR(S) : Robert L. Marcheso & Bohdan Lukaschewsky It is certified that error appears in the above–identified patent and that said Letters Patent are hereby corrected as shown below:

In claim 22, column 19, line 6, after "provide" add --- an output ---.

Signed and Sealed this twenty-second Day of June 1976

[SEAL]

Attest:

RUTH C. MASON
Attesting Officer

C. MARSHALL DANN
Commissioner of Patents and Trademarks